(12) United States Patent
Zhou et al.

(10) Patent No.: US 8,525,112 B2
(45) Date of Patent: Sep. 3, 2013

(54) VARIABLE PIXEL DENSITY IMAGING

(75) Inventors: Lin Zhou, Eagan, MN (US); Huiwen Liu, Eden Prairie, MN (US); Dale Egbert, Deephaven, MN (US); Peter Gunderson, Ellsworth, WI (US); John Ibele, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 215 days.

(21) Appl. No.: 12/854,122

(22) Filed: Aug. 10, 2010

(65) Prior Publication Data

US 2012/0042422 A1 Feb. 16, 2012

(51) Int. Cl.
*H01J 37/26* (2006.01)

(52) U.S. Cl.
USPC ........... 250/307; 250/306; 382/181; 382/194; 382/221; 702/27; 702/28; 702/29

(58) Field of Classification Search
USPC ................. 250/306, 307, 309, 310; 382/181, 382/194, 221; 702/23, 27, 28, 29, 128, 134; 850/8, 9, 10, 11, 19, 20, 62, 63
See application file for complete search history.

(56) References Cited

U.S. PATENT DOCUMENTS

| | | | |
|---|---|---|---|
| 5,415,027 A * | 5/1995 | Elings et al. | 73/105 |
| 7,406,860 B2 | 8/2008 | Zhou et al. | |
| 2008/0276696 A1 | 11/2008 | Zhou et al. | |

\* cited by examiner

*Primary Examiner* — Nicole Ippolito
(74) *Attorney, Agent, or Firm* — Mitchell K. McCarthy; McCarthy Law Group (57) ABSTRACT

A method and associated apparatus for topographically characterizing a workpiece. The workpiece is scanned with a scanning probe along a first directional grid, thereby scanning a reference surface and an area of interest subportion of the reference surface, at a variable pixel density including a first pixel density outside the area of interest and a second pixel density inside the area of interest to derive a first digital file characterizing topography of the workpiece. The workpiece is further scanned along the reference surface and the area of interest with the scanning probe along a second directional grid that is substantially orthogonal to the first directional grid and at a constant pixel density to derive a second digital file characterizing topography of the workpiece. A processor executes computer-readable instructions stored in memory that generate a topographical profile of the workpiece in relation to the first and second digital files.

25 Claims, 9 Drawing Sheets

VARIABLE PIXEL DENSITY IMAGING

SUMMARY

In some embodiments a method is provided for topographically characterizing a workpiece. The method includes steps of scanning the workpiece with a scanning probe along a first directional grid, thereby scanning a reference surface and an area of interest subportion of the reference surface, at a variable pixel density including a first pixel density outside the area of interest and a second pixel density inside the area of interest to derive a first digital file characterizing topography of the workpiece; scanning the reference surface and the area of interest with the scanning probe along a second directional grid, that is substantially orthogonal to the first directional grid, at a constant pixel density to derive a second digital file characterizing topography of the workpiece; and executing computer-readable instructions stored in memory that generate a topographical profile of the workpiece in relation to the first and second digital files.

In some embodiments an apparatus is provided for topographically characterizing a workpiece. The apparatus has a scanning probe that obtains topographical data about the workpiece. A processor controls the scanning probe to scan the workpiece along a first directional grid, thereby scanning a reference surface and an area of interest subportion of the reference surface, at a variable pixel density including a first pixel density outside the area of interest and a second pixel density inside the area of interest to derive a first digital file characterizing topography of the workpiece, and to scan the workpiece along a second directional grid, that is substantially orthogonal to the first directional grid, at a constant pixel density to derive a second digital file characterizing topography of the workpiece. The apparatus further includes logic that generates a topographical profile of the workpiece in relation to the first and second digital files.

In some embodiments a topography metrology apparatus is provided having a processor controlling a scanning probe to collect first data along a variable pixel density grid and to collect second data along a constant pixel density grid to obtain topographical data about a workpiece, and means for integrating the first and second data to generate a topographical profile for the workpiece.

DETAILED DESCRIPTION

Figure 1:
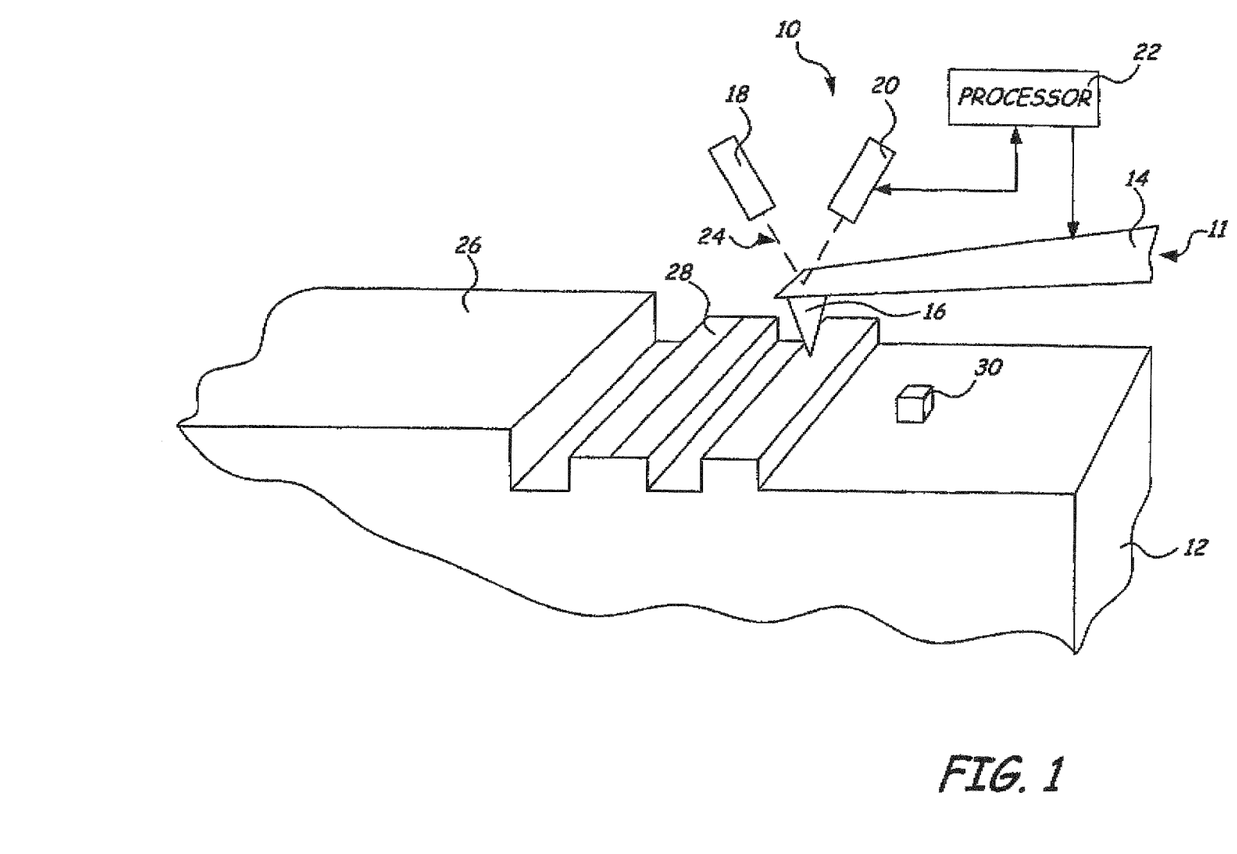
FIG. 1 is an isometric depiction of an atomic force microscope probe constructed and used in accordance with embodiments of the present invention.

FIG. 1 is a perspective view an atomic force microscope 10 positioned over a surface of structure 12 (sometimes referred to herein as "workpiece"). Atomic force microscope 10 includes probe 11 having cantilever portion 14 and tip portion 16. Atomic force microscope 10 also includes light source 18, position sensitive detector 20, and processor 22. Light source 18 emits a beam 24 that is reflected by cantilever 14 and received by position sensitive detector 20. Processor 22 receives signals from position sensitive detector 20 and provides signals to control movement of probe 11 relative to structure 12.

Structure 12 in these illustrative embodiments is the pole tip region of a magnetic recording system, including slider 26 carrying reader structure 28 and writer structure 30. The atomic force microscopy (AFM) techniques described herein are useful for measuring and imaging feature characteristics of structure 12, such as pole tip recession (PTR) features of reader structure 28 and writer structure 30. It should be noted that structure 12 is shown merely for purposes of illustration, and the AFM techniques described herein are also useful for measuring and imaging nanometer and micrometer scale surface features of other structures. For example, the AFM techniques may also be used to measure feature characteristics in other magnetic recording device structures, such as a cavity transition feature as shown in FIG. 2.

Atomic force microscope 10 measures physical characteristics or properties of structure 12, such as feature dimensions and surface finish. Probe tip 16 is positioned in very close proximity (i.e., within picometers) to the surface of structure 12 to allow measurements of structure 12 over a small area. Probe tip 16 is moved relative to structure 12 using extremely precise positioning. For example, processor 22 may control motion of probe 11 such that probe tip moves along the surface of stationary structure 12. Alternatively, processor 22 may control a device such as a tube scanner to move structure 12 while probe 11 remains stationary. As probe tip 16 moves over the surface of structure 12, features on the surface of structure 12 cause cantilever 14 to bend in response to the force between probe tip 16 and structure 12.

The position sensitive detector 20 measures the amount of deflection in cantilever 14, which may be used to generate an image representation of structure 12. In particular, light source 18 (e.g., a laser) reflects light beam 24 off of cantilever 14 to position sensitive detector 20. Position sensitive detector 20 may include two side-by-side photodiodes such that the difference between the signals generated by the photodiodes indicates the position of light beam 24 on position sensitive detector 20, and thus the angular deflection of cantilever 14. Because the distance between cantilever 14 and position sensitive detector 20 is generally thousands of times the length of cantilever 14, the motions of probe tip 16 are greatly magnified.

Figure 2:
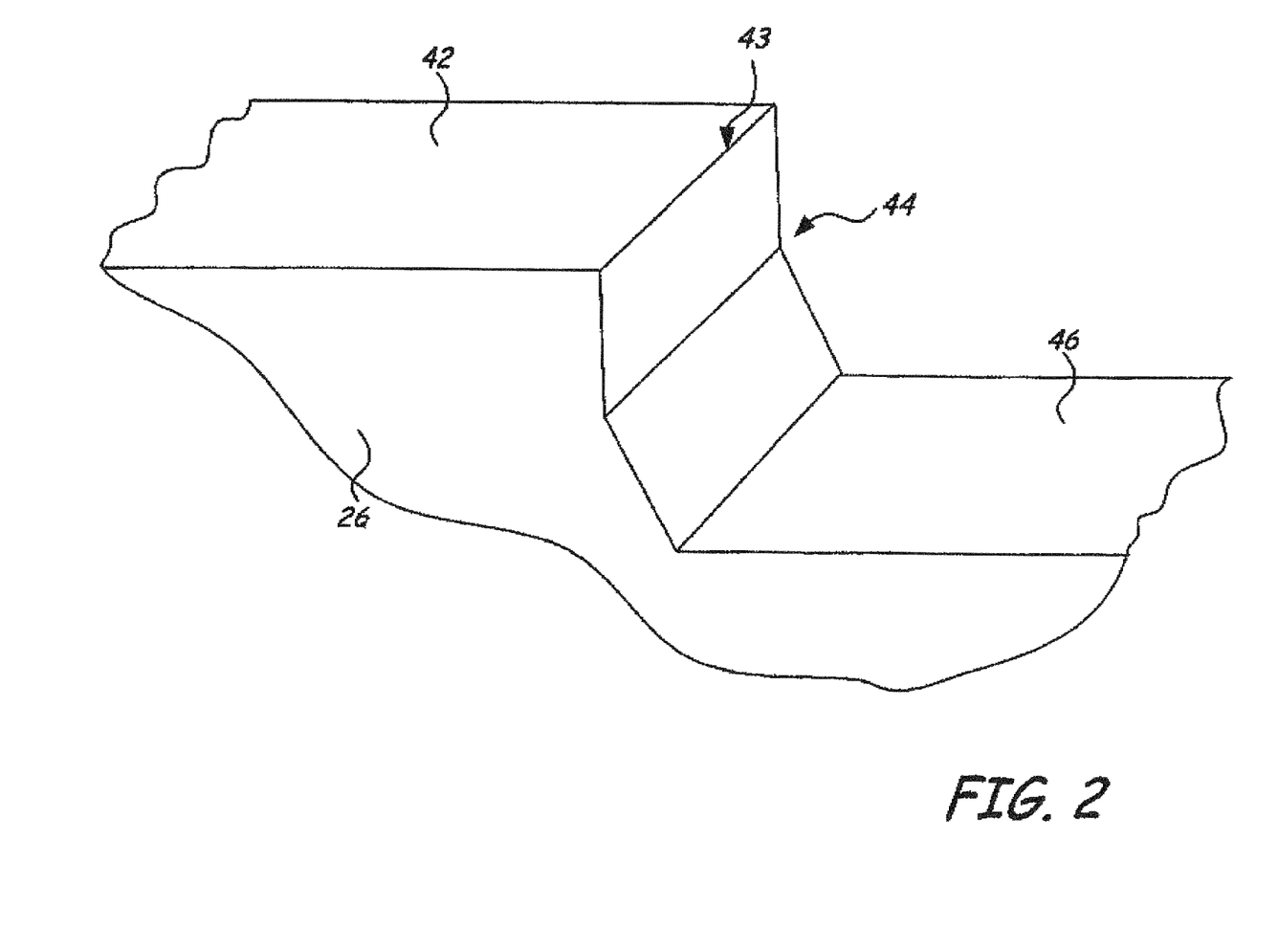
FIG. 2 is an isometric depiction of a cavity transition feature in a workpiece that is suited for measuring with atomic force microscopy (AFM) techniques of the present embodiments.

FIG. 2 is a perspective view of slider 26 including air bearing surface (ABS) 42, transition edge 43, cavity transition 44, and cavity 46. Cavity transition 44, which may be defined using ion milling techniques, has very small features varying from nanometer to micrometer scale sizes. Measurement of the features of cavity transition 44 is important in various aspects in the development of the device, including design improvement, device model validation, and device performance enhancement. For example, in a magnetic recording device, the measurement of cavity transition 44 is important for understanding flying performance of slider 26. The AFM techniques described herein may be used to measure the properties of cavity transition feature 44.

The lateral resolution of an image produced from a scan of a structure is defined by the scan area size and the number of pixels in the image. Conventionally, atomic force microscope 10 moves relative to the structure at a constant speed, and the position of probe 11 is periodically sampled by processor 22. The resulting image has a uniform resolution across the entire scanned region.

Some structures may include a region or area of interest having a target feature or characteristic of which a more detailed scan may be desired. For example, a detailed scan of cavity transition 44 of slider 40 shown in FIG. 2 may be desirable for precise measurement of the dimensions and other characteristics of the transition profile. In order to increase the resolution in the area of interest, the number of pixels or data points in the area of interest may be increased. Because the number of pixels available for a given scan is often fixed, the resolution in the area of interest is thus increased at the expense of limited views of the areas surrounding the area of interest. However, it is also important to maintain the contextual details around the area of interest such that the relative sizes and positions of features within the area of interest are more easily determinable.

Figure 3:
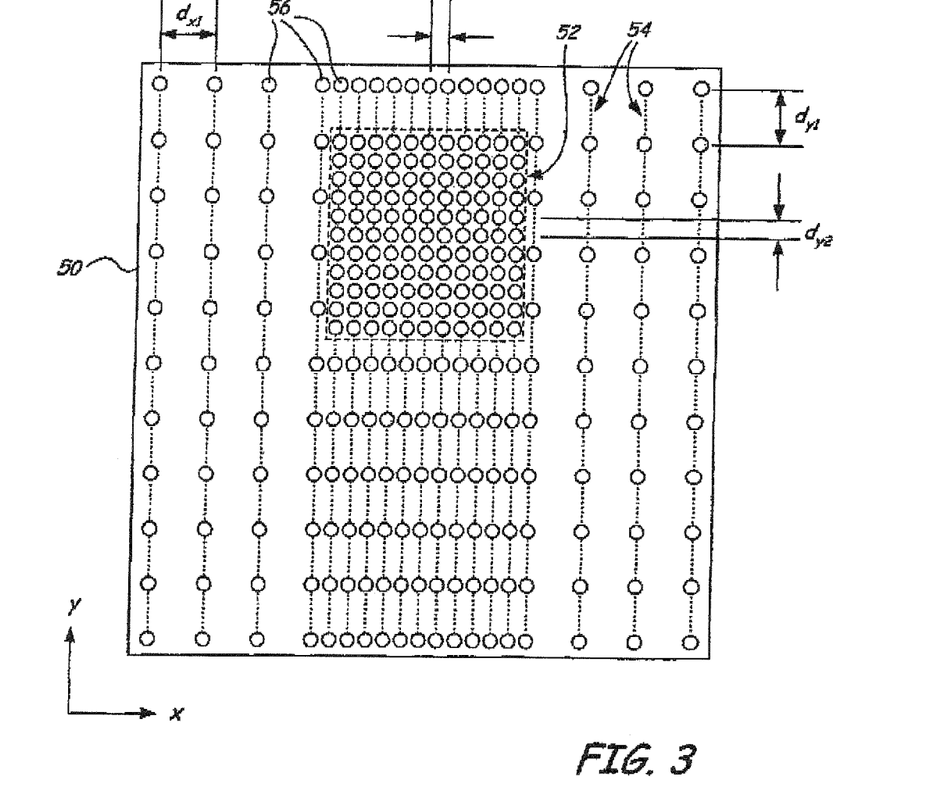
FIG. 3 depicts a variable pixel density directional grid of the present embodiments.

FIG. 3 is a schematic view of an approach for increasing the amount of data at an area of interest on a scanned structure while maintaining the contextual details of the surrounding areas. In FIG. 3A, the scan area 50 (or "reference surface") of a structure is shown including area of interest 52. Probe 11 moves around scan area 50 in scan pattern 54 during image acquisition in response to control signals from processor 22. In particular, scan pattern 54 is programmed in processor 22, and processor 22 controls movement of probe 11 relative to the structure in the programmed scan pattern 54. As probe 11 is moved relative along scan pattern 54 within scan area 50, data points or pixels 56 are sampled by processor 22. That is, processor 22 periodically communicates with position sensitive detector 20 to receive information about the position of probe tip 16 relative to position sensitive detector 20. This information is used by processor 22 to set locations of, and hence the density of, the pixels 56 in a digital file containing topographic information used to generate an image of the structure 12. The resulting image is representative of the structure in that it includes graphical representations of the surface features and characteristics of the structure.

Processor 22 samples pixels 56 in the portions of scan area 50 outside of area of interest 52 as probe 11 moves along the y-direction relative to the structure. The pixels 56 are separated by a distance $d_{y1}$ in the y-direction and a distance $d_{x1}$ in the x-direction in areas outside of the area of interest 52. In one embodiment, distance $d_{x1}$ and distance $d_{y1}$ are equal to provide a continuous lateral resolution in the portions of scan area 50 outside the area of interest 52.

In order to increase the resolution at the area of interest 52, scan pattern 54 is programmed such that more pixels 56 are sampled in the area of interest 52 during the scan than in the portions surrounding the area of interest 52. The programmed location of the area of interest 52 in scan pattern 54 may be determined during the scan based on known position information on the scanned structure, or based on surrounding feature characteristics sensed by probe tip 16. When probe tip 16 is close to the area of interest 52, processor 22 reduces the distance between adjacent scan lines in the x-direction to distance $d_{x2}$ to increase the density of data points 56 in the x-direction (i.e., probe tip 16 moves a smaller distance relative to the structure between adjacent scan lines). When probe tip 16 is in the area of interest 52, processor 22 increases the number of data points 56 sampled along each scan line (i.e., decreases the spacing between each data point 56 to $d_{y2}$), which increases the pixel density in the area of interest 52 in the y-direction. The resolution in the y-direction may be increased by, for example, increasing the rate at which processor 22 samples the position information of cantilever 14 from position sensitive decoder 20, by adjusting the rate at which probe 11 is moved relative to the structure, or a combination of increasing the sample rate and decreasing the relative motion between probe 11 and the structure. In the illustrative embodiment shown, the resolution of the scan in the area of interest 52 is three times that in the portions of scan area 50 surrounding the area of interest 52.

Atomic force microscope 10 allows the density of pixels 56 to be adjusted during the scanning process. From a single scan, the resulting image of the structure has a higher resolution in the area of interest 52 than in the remainder of scan area 50. This scan process not only preserves the contextual details in the areas around the area of interest 52, but also allows for greater throughput of scans and measurements of the structure since multiple scans are not required.

It should be noted that scan pattern 54 is merely illustrative, and other scan patterns may be used for imaging a structure having different characteristics. For example, if a structure includes multiple areas of interest, the scan pattern may be programmed to increase the sampling rate or reduce the scan speed at the multiple areas of interest to increase the resolution in those areas. In addition, scan pattern 54 may include multiple levels of resolution within the same scan area 50.

When a structure (such as slider 26) is scanned by atomic force microscope 10, it is held in position on a linear stage or other positioning device, such as in a tray, by a fixture, or with adhesive. However, due to positioning errors, the structure may not be precisely aligned with atomic force microscope 10 with respect to the contours of the programmed scan pattern. For example, the structure may be skewed in one direction relative to the scan pattern, or the structure may be tilted relative to the plane of the scan pattern. The image resulting from the misaligned scan thus may not represent the true profile of the structure, making an accurate measurement of the dimensions of the scanned structure and features of the structure difficult. In addition, even if the positioning of the structure relative to atomic force microscope 10 is perfect, variations in the components of atomic force microscope 10 (e.g., due to environmental conditions) may result in a misaligned image.

For example, in a scan of slider 26 (FIG. 2), the dimensions and characteristics of cavity transition 44 may be measured. Measurement of cavity transition 44 is important for understanding flying performance of slider 26, as well as for device design improvement, model validation, and performance enhancement. Cavity transition 44 may be measured relative to another feature on slider 26, such as ABS 42, to allow for analysis of the shape of cavity edge 43 and cavity transition 44. However, if the image of ABS 42 is skewed or tilted due to mispositioning of slider 26 or due to performance of atomic microscope 10, characteristics of cavity transition 44 may be difficult to measure.

For example, at micrometer-level scan lengths, bowing can occur in traditional tube scanner atomic force microscopes, which may also produce curvature in the resulting image. The amplitude and shape of the bowing vary between atomic force microscopes, and may change with aging, temperature, and humidity. Positional offsets between scans of the same surface in the same scan area may also vary the curvature in the corresponding image. To avoid the contribution of bowing to measurement error, a reference scan may be taken on a flat surface with the same scan settings (e.g., scan size and offsets) of a regular scan. The reference scan is subsequently subtracted from the regular scan to obtain an image without curvature due to the bowing effect. However, any real curvature in the surface of the reference scan will be added to the measurement results. In addition, scan defects, irregular scan lines, and particle contamination in the reference scan may add error to the measurement results.

FIGS. 4A-4D show another approach to correcting the skew (or "drift") and tilt in an image based on a scan of slider 26 including cavity transition feature 44. To minimize alignment artifacts caused by variations in the components of atomic force microscope 10 and environmental conditions, the scan was performed at a 0.2 Hz sampling rate with probe tip 16 having a radius of less than about 30 nm proximate to slider 26. Each step described herein with regard to correcting the drift and tilt in the image may be performed by processor 22 or by a microprocessor based system external to atomic force microscope 10.

Figure 4A:
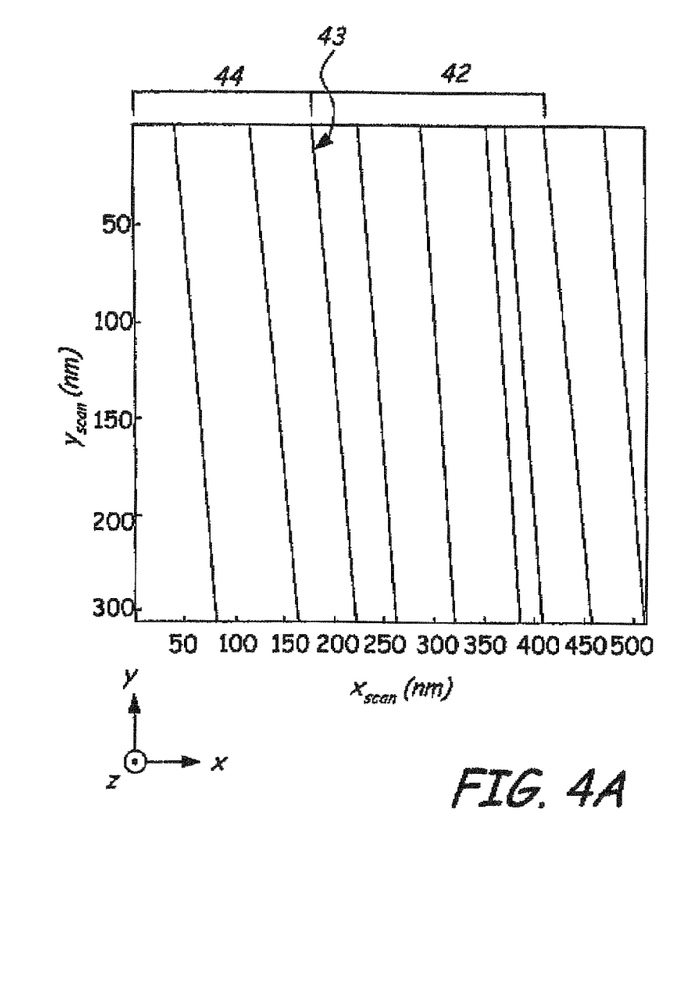
FIG. 4A is a two-dimensional plot of a raw scanned image profile of a cavity transition feature.

FIG. 4A is a two-dimensional plot of a raw scanned image profile based on a scan of slider 26 including cavity transition 44 under the above conditions. The contour lines shown in the plot in FIG. 4A represent height changes in slider 26 relative to the z-axis. For context, transition edge 43 and cavity transition 44 are labeled in the image. As is shown, the image representative of slider 26 drifts relative to the y-axis. In addition, the height change relative to the z-axis should be more pronounced at cavity transition 44, and ABS 42 should include no contour lines because it should be co-planar with the x-axis and the y-axis. However, because few contour lines are shown at cavity transition 44 and several contour lines are shown around ABS 42, the image is also tilted relative to the desired orientation (i.e., with ABS 42 parallel with the xy-plane). The correction of the tilt in the image will be described with regard to FIGS. 4C and 4D.

Figure 4B:
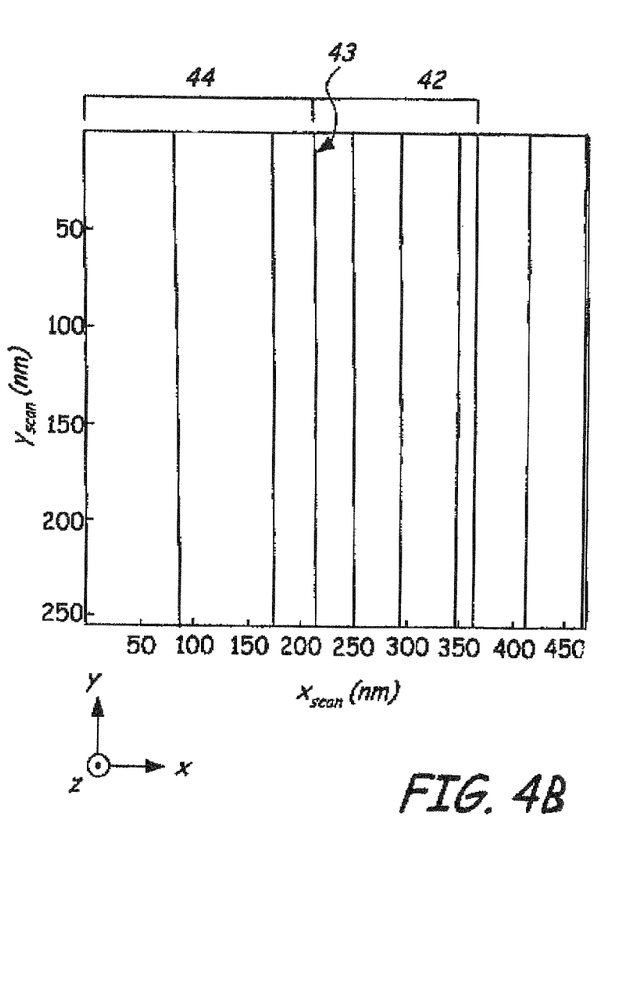
FIG. 4B is a two-dimensional plot of a tilted image profile of the cavity transition feature.

The drift in the two-dimensional view of slider 26 may be corrected by choosing a feature in the scan and re-orienting the image based on that feature. For example, a derivative map of the image (i.e., a plot of the derivative at every location in the image) shown in FIG. 4A may be generated to determine the locations of transition features (e.g., transition edge 43) in slider 26. The transition feature may then be used as an alignment index for aligning the image within the two-dimensional view. FIG. 4B shows the two-dimensional image of slider 26 including cavity transition 44 after aligning the image relative to the x-axis and y-axis based on transition edge 43 to correct the image for drift.

Figure 4C:
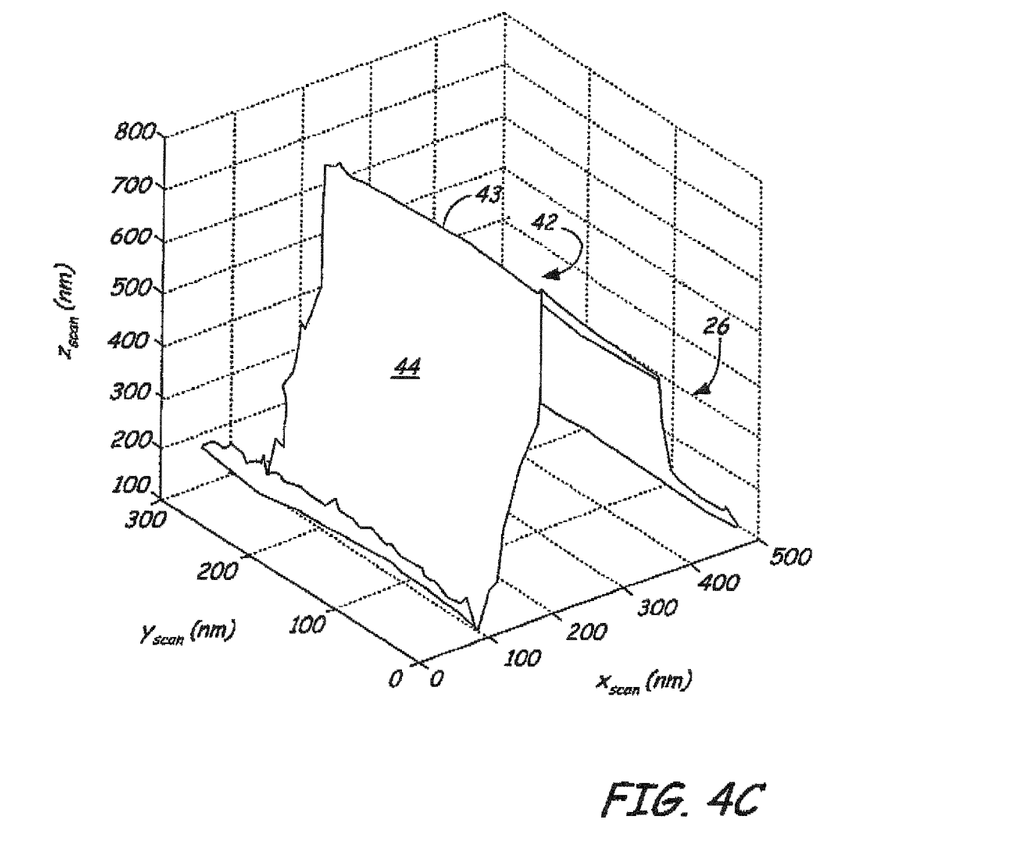
FIG. 4C is a three-dimensional plot of the tilted image profile shown in FIG. 4B.

FIG. 4C is a three-dimensional plot of the tilted image profile of slider 26. As can be seen, while transition edge 43 is aligned with the y-axis, ABS 42 is tilted relative to the xy-plane. To facilitate measurement of cavity transition 44, the image of slider 26 may be rotated relative to the xy-plane. While this rotation may be performed in Cartesian coordinates, the rotation is simplified by first converting each data point in the image of slider 26 to spherical coordinates. Thus, for each data point having coordinates (x, y, z), the corresponding spherical coordinates (R, θ, φ) are given by $$R = \sqrt{x^2 + y^2 + z^2}$$

$$\theta = \arctan\left(\frac{y}{x}\right)$$

$$\varphi = \arctan\left(\frac{z}{\sqrt{x^2 + y^2}}\right)$$

where R is distance from the origin to the data point, θ is the angle from the xz-plane to the point, and φ is the angle from the xy-plane to the point.

The image of slider 26 may be rotated relative to the xy-plane to level ABS 42 by offsetting the angle φ by a correction angle α based on the slope of the tilted ABS 42, $$\alpha = \arctan\left(\frac{dy}{dx}\right)$$

where dy/dx is the slope of tilted ABS 42 relative to the xy-plane. To rotate the image of slider 26, each data point may be offset by correction angle α and converted from spherical coordinates back to Cartesian coordinates. Thus, for each data point having coordinates (R, θ, φ−α), the corresponding Cartesian coordinates (x, y, z) are given by $$x = R\cos(\varphi-\alpha)\cos(\theta)$$

$$y = R\cos(\varphi-\alpha)\sin(\theta)$$

$$z = R\sin(\varphi-\alpha)$$

Figure 4D:
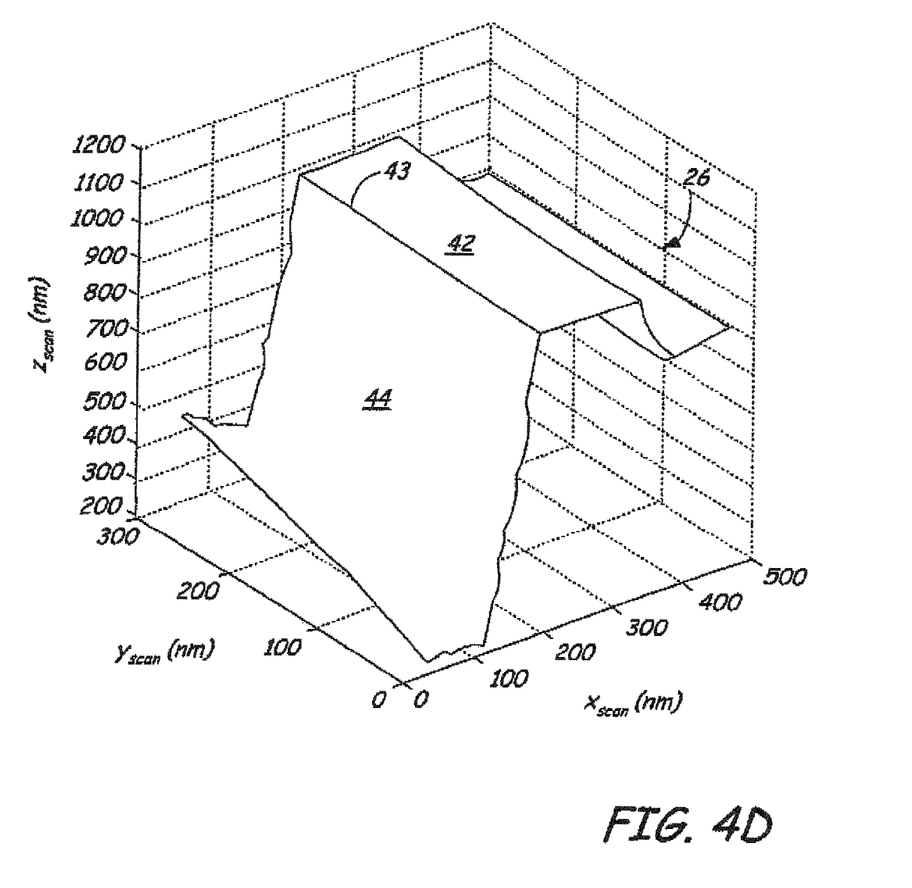
FIG. 4D is a three-dimensional plot of a corrected image profile of the cavity transition feature.

A plot of the three-dimensional image after rotation, which reflects the true profile of the slider 26 and cavity transition 44, is shown in FIG. 4D.

During an AFM scan, the processor 22 moves the probe tip 16 along the scanned surface faster in one direction than in the other direction. For example, as depicted in the embodiments of FIG. 3 above, probe tip 16 samples the reference surface 50 along a first directional grid running vertically, or in other words along the y-axis direction. Thus, for each scan line in the first directional grid, a length of a group of pixels 56 is sampled in the y-direction (the "fast scan" direction), while a width of only a single pixel is sampled in the x-direction (the "slow scan" direction). As discussed, the first directional grid encompasses both the reference surface 50 and the area of interest 52 subportion of the reference surface 50. Thus, the first directional grid ultimately performs a scan of a variable pixel density, because it includes a first pixel density $d_{x1}$, $d_{y1}$ outside the area of interest 50 and a second pixel density $d_{x2}$, $d_{y2}$ inside the area of interest 52 to derive a first digital file characterizing topography of the workpiece.

In the fast scan direction, it takes a relatively shorter time to move the probe tip 16 from one end of the reference surface 50 to the other end, in comparison to the time it takes to move in the slow scan direction from one end of the reference surface 50 to the other end. Without correcting for the differences in the times, process variations such as environmental vibrations, machine drifting, and airflow along probe 11 can cause curvature artifacts in the image in the slow scan direction.

Figure 5A:
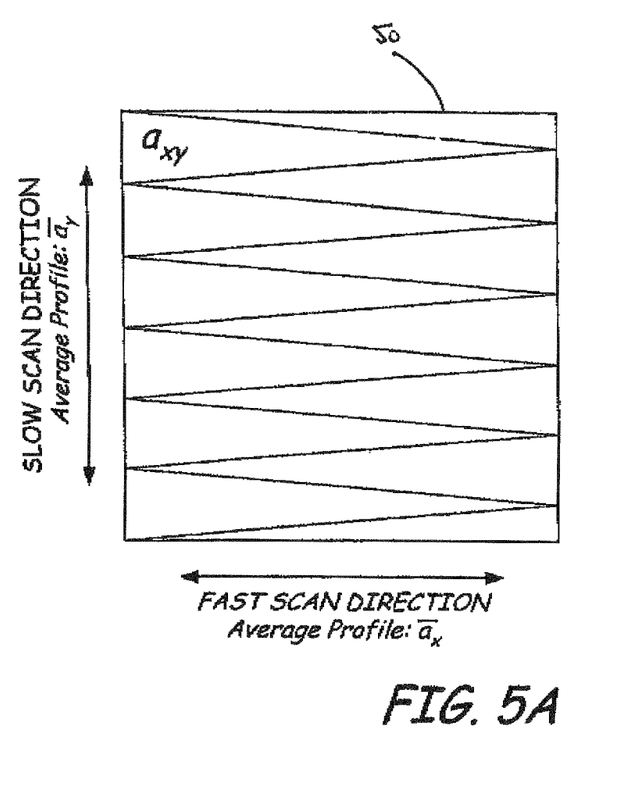
FIG. 5A diagrammatically depicts a first scan along a horizontal directional grid.
Figure 5B:
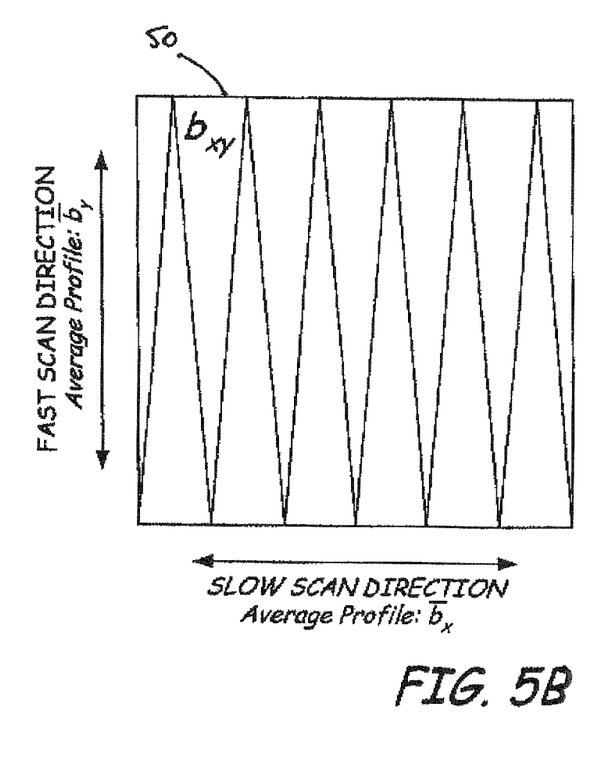
FIG. 5B diagrammatically depicts a second scan along a vertical directional grid.

FIGS. 5A and 5B diagrammatically depict a paired scanning scheme that can be used to correct for such image curvature artifacts in an AFM scan. For discussion sake, the scans depicted in FIGS. 5A and 5B encompass the reference surface 50, including the area of interest 52, and are orthogonally directed with respect to each other. No particular scan pattern itself is depicted in these FIGS., but rather they generally diagrammatically depict a horizontal directional scanning grid (FIG. 5A) and a vertical directional scanning grid (FIG. 5B).

In FIG. 5A, the scanned reference surface 50 can be represented by a matrix of pixels $a_{xy}$ (x, y=1~n, where n is the periphery dimension of the reference surface 50). For simplicity, the reference surface 50 shown is square, but the curvature artifact correction method described is also applicable to scan areas having other dimensions and characteristics. For this horizontal directional grid, the fast scan direction is the x-direction and the slow scan direction is the y-direction. The fast scan direction has an average profile $\bar{a}_x$ and the slow scan direction has an average profile $\bar{a}_y$, where $$\bar{a}_x = \frac{1}{n}\sum_{y=1}^{n} a_{xy},$$

$$\bar{a}_y = \frac{1}{n}\sum_{x=1}^{n} a_{xy}$$

Similarly, in FIG. 5B, the reference surface 50 can be represented by a matrix of pixels $b_{xy}$ (x, y=1~n, where n is the periphery dimension of the reference surface 50). In this vertical directional grid, the fast scan direction is the y-direction and the slow scan direction is the x-direction. The fast scan direction has an average profile $\bar{b}_y$ and the slow scan direction has an average profile $\bar{b}_x$:

$$\bar{b}_x = \frac{1}{n}\sum_{y=1}^{n} b_{xy}$$

$$\bar{b}_y = \frac{1}{n}\sum_{x=1}^{n} b_{xy}$$

The average profiles along the fast scan direction in the two scans, $\bar{a}_x$ and $\bar{b}_y$, represent the true profile of the structure, while the average profiles along the slow scan direction, $\bar{a}_y$ and $\bar{b}_x$, are a combination of the true profile of the structure and curvature artifacts due to tilting and drifting of atomic force microscope 10 and other environmental effects along the slow scan direction. Where a uniform pixel density is used in scanning for both of the orthogonal directional grids, a flattened profile that corrects for drift, $c_{xy}$, is defined by:

$$c_{xy} = \frac{1}{2}\left[\left(b_{xy} - \frac{1}{n}\sum_{y=1}^{n} b_{xy} \times [1 \ \ldots \ 1]_m + \frac{1}{n}\sum_{y=1}^{n} a_{xy} \times [1 \ \ldots \ 1]_m\right) + \left(a_{xy} - \frac{1}{m}\begin{bmatrix}1\\ \ldots \\ 1\end{bmatrix}_n \times \sum_{x=1}^{m} a_{xy} + \frac{1}{m}\begin{bmatrix}1\\ \ldots \\ 1\end{bmatrix}_n \times \sum_{x=1}^{m} b_{xy}\right)\right]$$

However, in scans employing a variable pixel density the high pixel density area will be dominant in the curve fitting results of this derivation due to the high pixel count per unit area, skewing the results for purposes of correcting for drift. The present embodiments resolve that difficulty without sacrificing the benefits of variable pixel density scanning where both a limited high resolution and a large field of view are needed simultaneously.

Continuing from FIG. 3, which again depicts the processor executing computer-readable instructions to scan along the first directional grid, in this case a vertical grid like the diagrammatic depiction of FIG. 5B, with a variable pixel density to obtain a higher resolution in the area of interest 52 than otherwise in the reference surface 50. The pixel pattern for the first directional grid is depicted in FIG. 3 by the pattern of empty circles. The metrology data for generating a topographical profile is obtained from data collected in that first directional grid.

Figure 6:
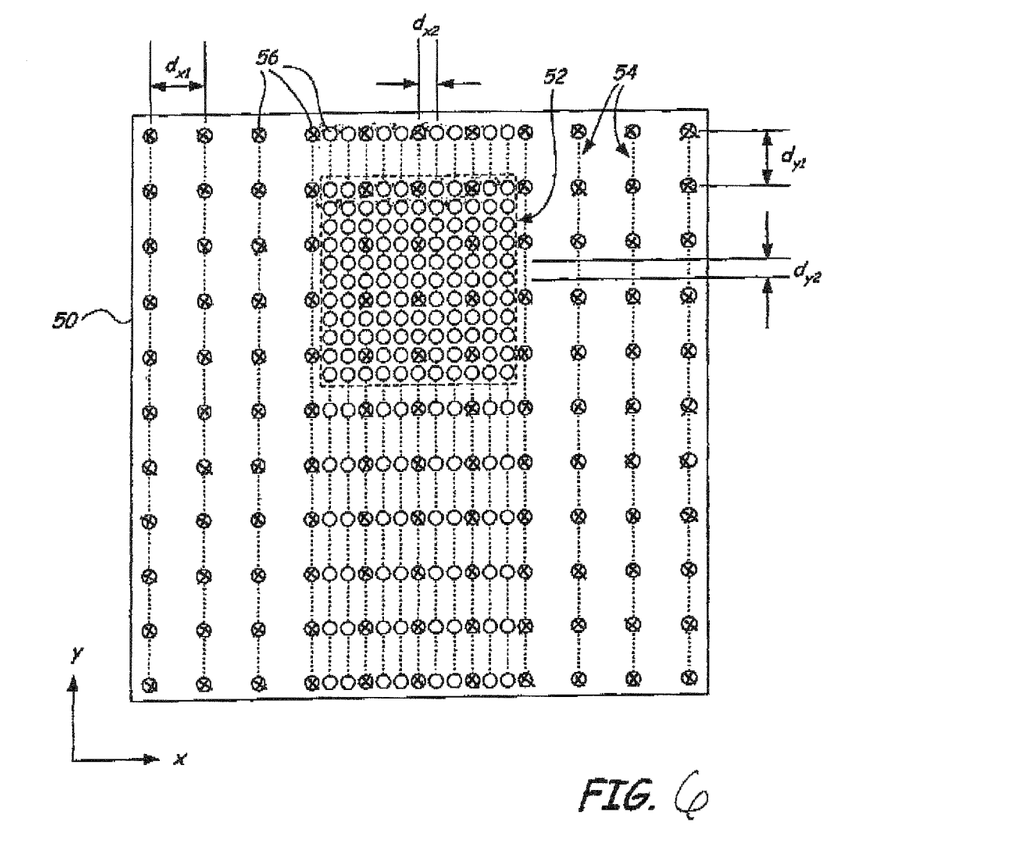
FIG. 6 depicts the vertical directional grid of FIG. 3 and a constant pixel density horizontal directional grid in accordance with the present embodiments.

FIG. 6 depicts the manner in which the processor 22 then scans the reference surface 50 and the area of interest 52 with the scanning probe along the second directional grid, in this case a horizontal grid, that is substantially orthogonal to the first directional grid. The second directional grid is only used for flattening the first grid to correct for drift. Accordingly, a constant pixel density that is less than the density of the area of interest 52 can be used to improve processing throughput while achieving acceptable flattening results. In these illustrative embodiments the constant pixel density of the second directional grid is matched to the constant pixel density of the first directional grid outside the area of interest 52. The pixel pattern for the second directional grid is depicted in FIG. 6 by the circles of the first directional grid now having X's in them.

Figure 7:
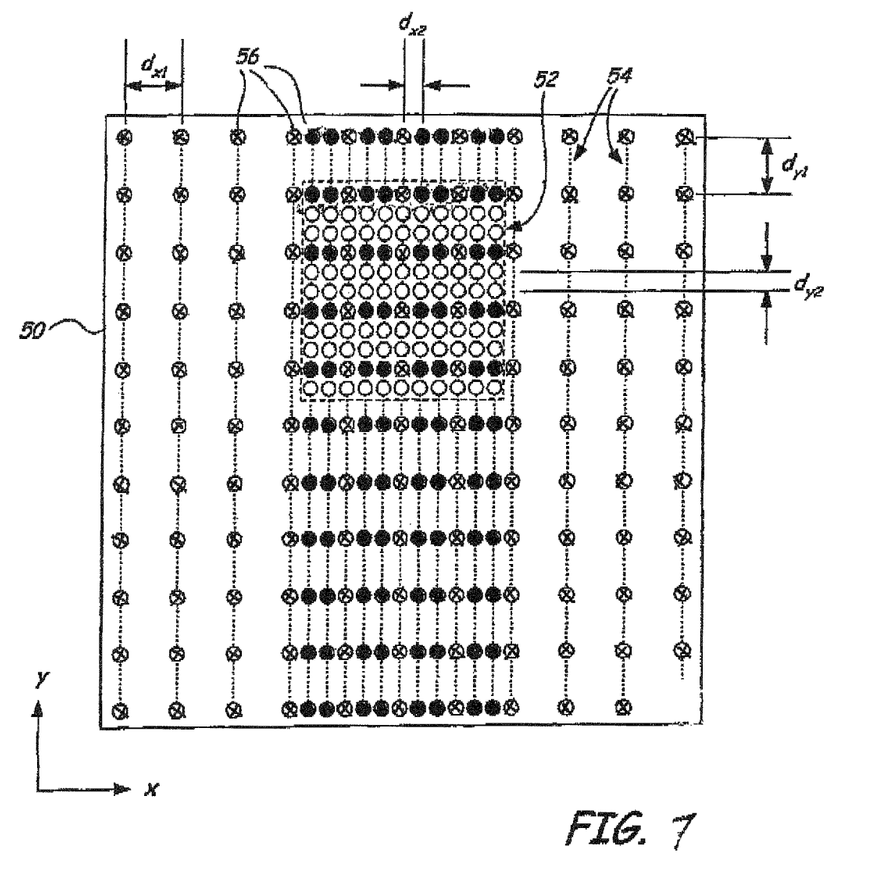
FIG. 7 is a view similar to FIG. 6 but depicting the horizontal directional grid having been modified to match the variable pixel density of the vertical directional grid.

The processor 22 then continues to execute computer-readable instructions stored in memory to modify the second directional grid by interpolating pixels between those in the constant pixel density so that each scan line matches the variable line density of the first directional grid. FIG. 7 depicts the interpolated pixels by the circles of the first directional grid now being solidly filled in. The processor 22 can then generate a topographical profile of the workpiece that is corrected for drift in terms of the digital files obtained from scanning along the first and second directional grids according to this derivation:

$$c_{xy} = \left[a_{xy} - \frac{1}{k}\begin{bmatrix}1\\ \ldots \\ 1\end{bmatrix}_n \times \sum_{x=1}^{k} a_{xy} + \frac{1}{k}\begin{bmatrix}1\\ \ldots \\ 1\end{bmatrix}_n \times \sum_{x=1}^{k} b_{xy}\right]$$

Generally, embodiments of the present invention contemplate a topography metrology apparatus and associated methodology of using a processor controlling a scanning probe to collect first data along a variable pixel density grid and to collect second data along a constant pixel density grid to obtain topographical data about a workpiece. Further, means for integrating the first and second data are employed to generate a topographical profile for the workpiece. For purposes of this description and meaning of the appended claims, the term "means for integrating" specifically encompasses a meaning that includes the disclosed structure and equivalents thereof. "Means for integrating" does not include previously attempted solutions at variance with the disclosed structure such as those that collect data from two constant pixel density grids or two variable pixel density grids.

In summary, a topographic profile of a structure is generated using atomic force microscopy. The structure is scanned such that an area of interest of the structure is scanned at a higher resolution than portions of the structure outside of the area of interest. An image of the structure is then generated based on the scan. The resulting image of the structure has a higher resolution in the area of interest than in the remainder of scan area. This scan process preserves the contextual details in the areas around the area of interest. The structure is scanned along a variable pixel density directional grid, and to correct for drift along the slow axis the structure is also scanned along an orthogonal constant pixel density directional grid.

Although the present invention has been described with reference to preferred embodiments, workers skilled in the art will recognize that changes may be made in form and detail without departing from the spirit and scope of the invention.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts and values for the described variables, within the principles of the present embodiments to the full extent indicated by the broad general meaning of the terms in which the appended claims are expressed.

What is claimed:

1. A method of topographically characterizing a workpiece, comprising:
    scanning the workpiece with a scanning probe along a first directional grid, thereby scanning a reference surface and an area of interest subportion of the reference surface, at a variable data point density including a first data point density outside the area of interest and a second data point density inside the area of interest to derive a first digital file characterizing topography of the workpiece;
    scanning the reference surface and the area of interest with the scanning probe along a second directional grid that is substantially orthogonal to the first directional grid and at a constant data point density to derive a second digital file characterizing topography of the workpiece; and
    executing computer-readable instructions stored in memory that generate a topographical profile of the workpiece in relation to the first and second digital files.

2. The method of claim 1 characterized by the second data point density being greater than both the first data point density and the constant data point density.

3. The method of claim 2 characterized by the constant data point density and the first data point density being substantially equivalent.

4. The method of claim 1 wherein the executing step comprises modifying the second digital file by interpolating a data point in the second directional grid between two adjacent data points of the constant data point density.

5. The method of claim 4 wherein the executing step is characterized by the interpolated data point residing in the area of interest.

6. The method of claim 4 wherein the executing step is characterized by at least one of the two adjacent data points of the constant data point density residing in the area of interest.

7. The method of claim 4 wherein the executing step is characterized by interpolating a plurality of data points in the second directional grid to match the corresponding variable data point density in the first directional grid.

8. The method of claim 7 wherein the executing step is characterized by integrating the first digital file and the modified second digital file to generate the topographical profile of the workpiece.

9. The method of claim 1 wherein the executing step comprises:
    converting the profile from a first coordinate system to a second coordinate system;
    after the converting step, offsetting the profile by a correction factor in the second coordinate system to correct the profile; and
    converting the corrected profile from the second coordinate system to the first coordinate system.

10. The method of claim 1 wherein the executing step comprises aligning a surface feature of the profile with a plane of a predefined coordinate system to correct the profile.

11. The method of claim 1 wherein the scanning the workpiece along the first directional grid is characterized by a first scan including a first fast scan direction and a first slow scan direction, and the scanning the workpiece along the second directional grid is characterized by a second scan including a second fast scan direction substantially orthogonal to the first fast scan direction and a second slow scan direction that is substantially orthogonal to the first slow scan direction.

12. The method of claim 1 further comprising:
    generating a master reference scan of a reference flat surface; and
    subtracting the master reference scan from the profile to correct the profile.

13. An apparatus for topographically characterizing a workpiece, comprising:
    a scanning probe that obtains topographical data about the workpiece;
    a processor controlling the scanning probe to scan the workpiece along a first directional grid, thereby scanning a reference surface and an area of interest subportion of the reference surface, at a first data point density outside the area of interest and at a second data point density inside the area of interest to derive a first digital file characterizing topography of the workpiece, and to scan the workpiece along a second directional grid that is substantially orthogonal to the first directional grid at a constant data point density to derive a second digital file characterizing topography of the workpiece; and
    logic that generates a topographical profile of the workpiece in relation to the first and second digital files.

14. The apparatus of claim 13 wherein the second data point density is greater than both the first data point density and the constant data point density.

15. The apparatus of claim 14 wherein the constant data point density and the first data point density are substantially equivalent.

16. The apparatus of claim 13 wherein the logic modifies the second digital file by interpolating a data point in the second directional grid between two adjacent data points of the constant data point density.

17. The apparatus of claim 16 wherein the interpolated data point resides in the area of interest.

18. The apparatus of claim 16 wherein at least one of the two adjacent data points of the constant data point density reside in the area of interest.

19. The apparatus of claim 16 wherein the logic interpolates a plurality of data points in the second directional grid to match the corresponding variable data point density in the first directional grid.

20. The apparatus of claim 19 wherein the logic integrates the first digital file and the modified second digital file to generate the topographical profile of the workpiece.

21. The apparatus of claim 13 wherein the logic converts the profile from a first coordinate system to a second coordinate system, offsets the profile by a correction factor in the second coordinate system to correct the profile, and converts the corrected profile from the second coordinate system to the first coordinate system.

22. The apparatus of claim 13 wherein the logic aligns a surface feature of the profile with a plane of a predefined coordinate system to correct the profile.

23. The apparatus of claim 13 wherein the processor scans the workpiece along the first directional grid according to a first scan including a first fast scan direction and a first slow scan direction, scans the workpiece along the second directional grid according to a second scan including a second fast scan direction that is substantially orthogonal to the first fast scan direction and a second slow scan direction that is substantially orthogonal to the first slow scan direction.

24. The apparatus of claim 13 wherein the logic generates a master reference scan of a reference flat surface, and subtracts the master reference scan from the profile to correct the profile.

25. A method of topographically characterizing a workpiece, comprising:
   scanning the workpiece with a scanning probe along a first directional grid at a variable data point density to derive a first digital file characterizing topography of the workpiece;
   scanning the workpiece with the scanning probe along a second directional grid at a constant data point density to derive a second digital file characterizing topography of the workpiece; and
   executing computer-readable instructions stored in memory that match a plurality of the data points in the second digital file to a corresponding plurality of the data points in the first digital file to correct for drift in the first digital file.

\* \* \* \* \*